United States Patent
Cohen et al.

(10) Patent No.: US 10,148,469 B2
(45) Date of Patent: Dec. 4, 2018

(54) APPARATUS AND METHOD FOR CANCELLING PRE-CURSOR INTER-SYMBOL-INTERFERENCE

(71) Applicant: INTEL CORPORATION, Santa Clara, CA (US)

(72) Inventors: Mor M. Cohen, Haifa (IL); Yaniv Hadar, Yokneam Elite (IL); Ehud U. Shoor, Haifa (IL)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 15/583,644

(22) Filed: May 1, 2017

(65) Prior Publication Data

US 2018/0316524 A1    Nov. 1, 2018

(51) Int. Cl.
| | |
|---|---|
| *H04L 7/00* | (2006.01) |
| *H03M 1/10* | (2006.01) |
| *H04L 25/03* | (2006.01) |
| *H04L 7/033* | (2006.01) |

(52) U.S. Cl.
CPC .......... *H04L 25/03949* (2013.01); *H04L 7/00* (2013.01); *H04L 7/033* (2013.01); *H04L 25/03057* (2013.01); *H04L 2201/02* (2013.01); *H04L 2201/04* (2013.01)

(58) Field of Classification Search
CPC .......... H04L 7/0062; H04L 2025/0349; H04L 1/0054; H04L 25/03267; H04L 1/00; H04L 7/007; H04L 1/205; H04L 25/03; H04L 25/03019; H04L 7/0037; H04L 2025/03585; H04L 2025/03592; H04L 25/03114

USPC .......................................... 375/355; 341/120
See application file for complete search history.

(56) References Cited

U.S. PATENT DOCUMENTS

| | | | |
|---|---|---|---|
| 2010/0046683 A1* | 2/2010 | Beukema | H04L 7/0062 375/355 |
| 2014/0169438 A1 | 6/2014 | Lin et al. | |
| 2014/0177699 A1 | 6/2014 | Tan et al. | |
| 2014/0307769 A1* | 10/2014 | He | H04L 7/0062 375/233 |
| 2015/0349991 A1* | 12/2015 | Iyer | H04L 25/03146 375/233 |
| 2016/0127155 A1 | 5/2016 | Johnson et al. | |
| 2016/0234043 A1 | 8/2016 | Azenkot et al. | |

OTHER PUBLICATIONS

PCT—International Search Report & Written Opinion dated Jul. 26, 2018 for PCT Patent Application No. PCT/US2018/026127.

\* cited by examiner

*Primary Examiner* — Sam K Ahn
*Assistant Examiner* — Sarah Hassan
(74) *Attorney, Agent, or Firm* — Green, Howard & Mughal LLP

(57) ABSTRACT

An apparatus is provided which comprises: a data slicer to receive first data sampled by a data clock; an edge slicer to receive second data sampled by an edge clock; and a Least Mean Square (LMS) circuitry coupled to the data and edge slicers, wherein the LSM circuitry is to generate a code to adjust a phase of one of data clock and/or edge clock relative to one another.

20 Claims, 12 Drawing Sheets

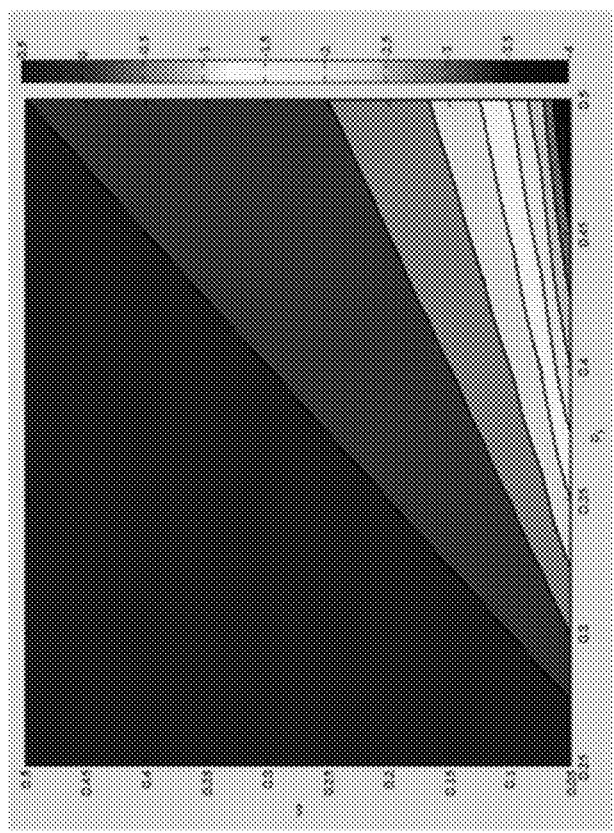
Fig. 6

APPARATUS AND METHOD FOR CANCELLING PRE-CURSOR INTER-SYMBOL-INTERFERENCE

BACKGROUND

The electrical path of high-speed communication suffers from severe inter-symbol interference (ISI) due to dispersion arising from frequency dependent channel characteristics which limits bit error rate (BER) performance. The ISI can be attributed to two time frames: post-cursor ISI, which originates from symbols transmitted after the cursor (i.e., sampled signal), and pre-cursor ISI, which originates from symbols transmitted before the cursor.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 6 illustrates a contour map of an optimum value for a step size $m_0$ for cursor correlation by the closed-loop adaptive scheme of some embodiments.

DETAILED DESCRIPTION

Figure 1:
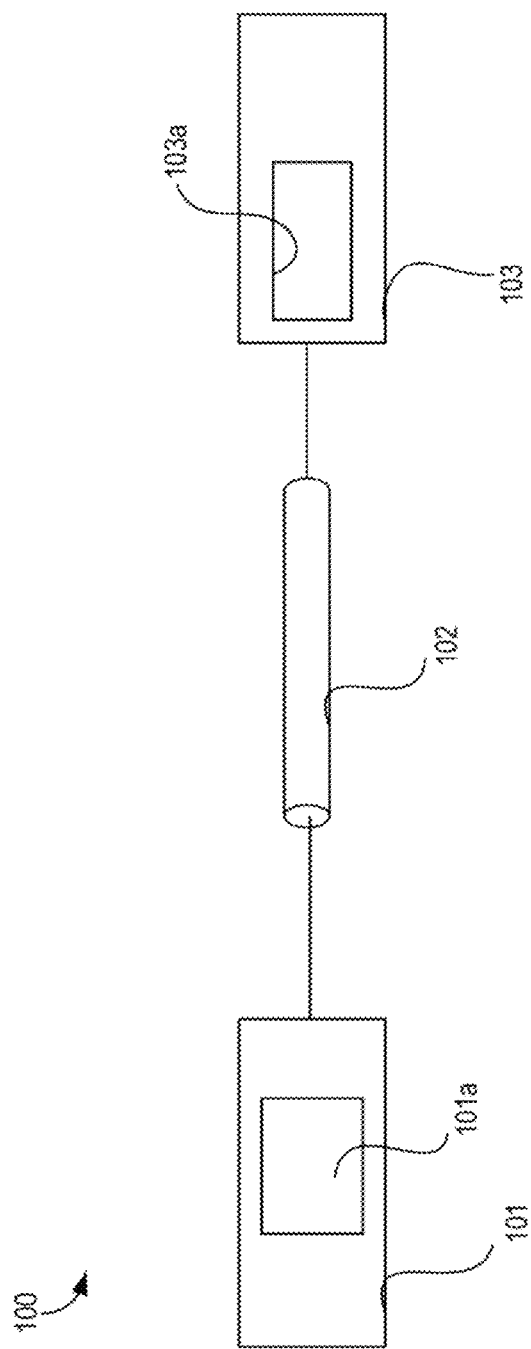
FIG. 1 illustrates a link having a transmitter and a receiver, where the receiver includes a closed-loop adaptive scheme and/or circuitry to cancel pre-cursor ISI, according to some embodiments of the disclosure.

To mitigate the impact of ISI on link performance, equalizers such as transmit finite impulse response (Tx-FIR) filter and receiver decision feedback equalizer (DFE) are widely used in high-speed links. DFE cancels the post-cursor ISI, while the Tx-FIR can cancel both post and pre-cursor ISI. Due to Tx-FIR filter's peak power constraint, cancelling a large pre-cursor ISI may not be practical. In such a case, the filter's anti-causal tap, denoted $c[-1]$, may have to be decreased until its minimum limit. Even when $c[-1]$ is at its minimum limit, there may still be large residual ISI. In addition, due to a large jitter noise, and due to the interaction between equalization adaptation and clock-data recovery (CDR), the minimization of the pre-cursor ISI using $c[-1]$ may not improve the link BER.

Various embodiments describe a novel closed-loop adaptive scheme that applies a gradient descent approach to adjust a locking phase of an edge-based clock data recovery (CDR) circuit. In some embodiments, the closed-loop adaptive scheme slowly adjusts the sampling phase offset between the clocks for the edge and data samplers, which in turn changes the CDR locking phase. The closed-loop adaptive scheme of some embodiments converges to a locking phase that minimizes (or reduces) the pre-cursor ISI, while maintaining a small (and adjustable) decrease in signal amplitude. Some embodiments adapt the CDR locking point, denoted $\tau$, such that the pre-cursor ISI is minimized or reduced.

Some embodiments described here may perform far better than known pre-cursor ISI reducing schemes. One known way to reduce ISI is to implement Mueller and Muller timing recovery scheme, which inherently cancels the pre-cursor ISI. One problem with such a timing recovery scheme is that its phase detector performs poorly without a proper DFE and TxFIR pulse shaping equalizer setting, and such timing recovery scheme requires a dedicated error slicer. The closed-loop adaptive scheme of various embodiments may work jointly with an edge-based phase detector in a closed-loop. The phase detector is some embodiments may not require a specific DFE or TxFIR shape, and the closed-loop adaptive scheme may slowly adjust the CDR locking point, and therefore may not require a dedicated error slicer.

Another known scheme to reduce ISI is to optimize the sampling phase by measuring any statistical information of a voltage margin X (also referred to as an "eye height" by a person of ordinary skill in the art), or time margin Y (also referred to as "eye width" by a person of ordinary skill in the art) associated with a received signal, or apply any linear combination of X and Y and to set the delta (or difference) as a function of that parametric evaluation of the receiver signal-to-noise ratio (SNR). Such a straight-forward SNR maximization scheme, using eye height or eye width based target function, is typically much more complex to implement, and does not apply in a close-loop fashion and is not suitable for fast and robust link convergence. Various embodiments use sign-LMS to implement a closed-loop adaptive scheme to provide a robust, easy to use, and easy to implement pre-cursor cancelling or reduction mechanism. Other technical effects will be evident from the description of the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates link 100 having transmitter 101 and receiver 102, where receiver 102 includes a closed-loop adaptive scheme 102a to cancel pre-cursor ISI, according to some embodiments of the disclosure. In some embodiments, transmitter 101 includes Tx-FIR filter 101a (also referred to as Tx-FIR). Here, transmitter 101 is coupled to receiver 103 via transmission media 102. Link 100 can be any high speed link. For example, link 100 is a Peripheral Component Interconnect Express (PCIe), 10 Gigabit Ethernet, Gigabit Ethernet, Serial AT Attachment (SATA), Universal Serial But (USB), Serial Attached SCSI (SAS), FireWire, Rapid IO (input-output), Digital Visual Interface (DVI), High Definition Multimedia Interface (HDMI), DisplayPort, etc.

In some embodiments, TX-FIR 101b can cancel both post and pre-cursor ISI. As data is transmitted by transmitter 101 and received by receiver 102 via channel or transmission media 103, ISI is generated at receiver 103 due to dispersion arising from frequency dependent channel characteristics which limits the BER performance. ISI is a signal distortion in which one symbol interferes with subsequent symbols (e.g., previous and future symbols). ISI makes communication less reliable. Here, the pre-cursor ISI originates from symbols transmitted before a cursor (e.g., sampled received signal) while the post-cursor ISI originates from symbols transmitted after the cursor (e.g., the sampled received signal). In some embodiments, DFE at receiver 103, in conjunction (or alone) with Tx-FIR 101b, is used for cancelling post-cursor ISI. In some cases, a joint DFE and Tx-FIR equalization technique is used in a high-speed link. However, due to Tx-FIR's peak power constrain, cancelling a large post or pre-cursor ISI may not be practical. In such cases, the main Tx-FIR tap may have to be decreased until a minimum limit, and the overall signal to noise ratio (SNR) may be decreased at receiver 102.

In some embodiments, DFE is used for cancelling post-cursor ISI which originates from symbols transmitted after the cursor (e.g., sampled signal). In some embodiments, pre-cursor ISI, which originates from symbols transmitted before the cursor is canceled by the closed-loop adaptive scheme 102b. In some embodiments, closed-loop adaptive scheme 102b applies a gradient descent approach to adjust a locking phase of an edge-based clock data recovery (CDR) circuit. In some embodiments, closed-loop adaptive scheme 102b slowly adjusts a sampling phase offset between the clocks for edge and data samplers, which in turn changes the CDR locking phase. The closed-loop adaptive scheme 102b of some embodiments converges to a locking phase that minimizes the pre-cursor ISI, while maintaining a small (and adjustable) decrease in signal amplitude.

Figure 2:
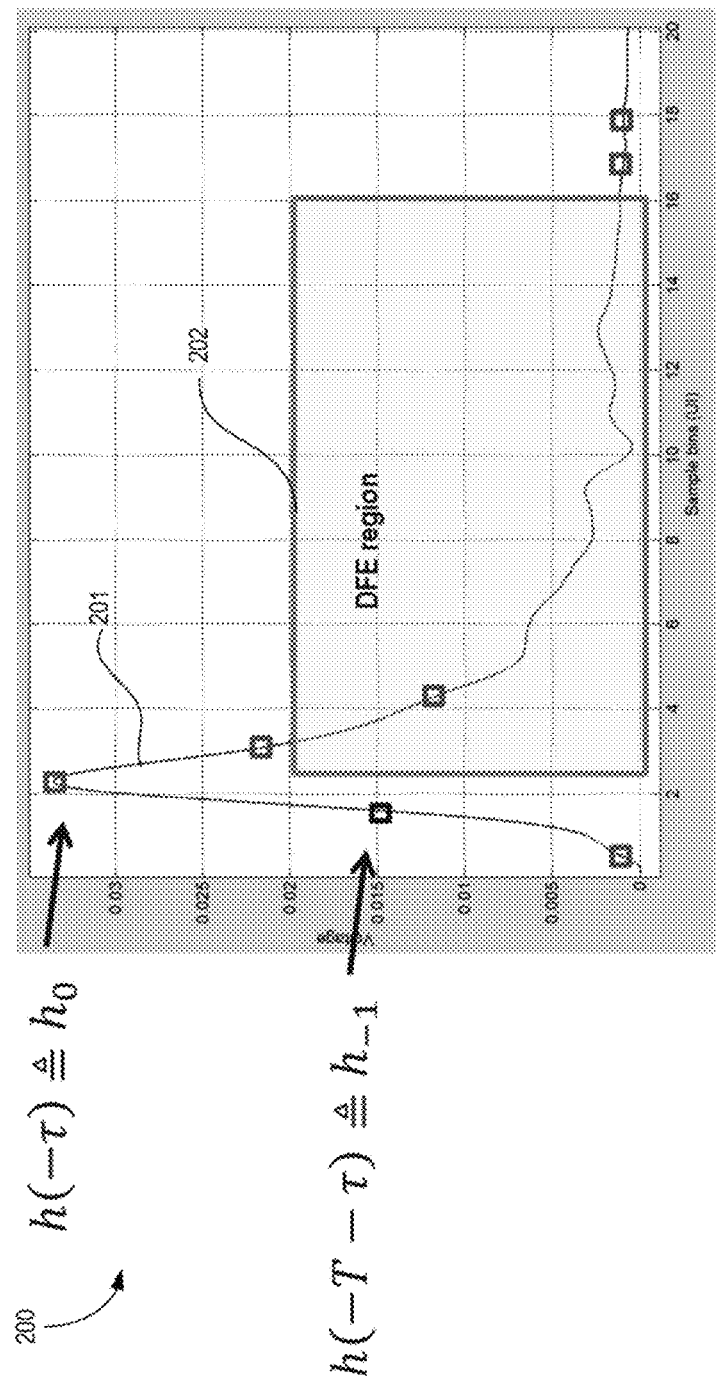
FIG. 2 illustrates a plot showing effectiveness of decision feedback equalizer (DFE) for post-cursor ISI cancellation, while pre-cursor ISI is cancelled by the closed-loop adaptive scheme of some embodiments.

FIG. 2 illustrates plot 200 showing effectiveness of DFE for post-cursor ISI cancellation, while pre-cursor ISI is cancelled by the closed-loop adaptive scheme of some embodiments. Here, x-axis is sample bins (Unit Interval UI) while the y-axis is voltage. Waveform 201 illustrates the positions of the data cursor $h_0$ and the first residual ISI pre-cursor $h_{-1}$. The square near the '0' voltage point and to the left of the first residual ISI pre-cursor $h_{-1}$ is the second residual ISI pre-cursor $h_{-2}$. The first square to the right of data cursor $h_0$ is the first ISI post-cursor $h_{+1}$. The second square to the right of the first ISI post-cursor $h_{+1}$ is the second ISI post-cursor $h_{+2}$. In some embodiments, the first ISI post-cursor $h_{+1}$ and/or the second ISI post-cursor $h_{+2}$ are cancelled by DFE. The region of influence of DFE is indicated by region 202. In some embodiments, the first residual ISI pre-cursor $h_{-1}$ is cancelled by the closed-loop adaptive scheme 102b.

Figure 3:
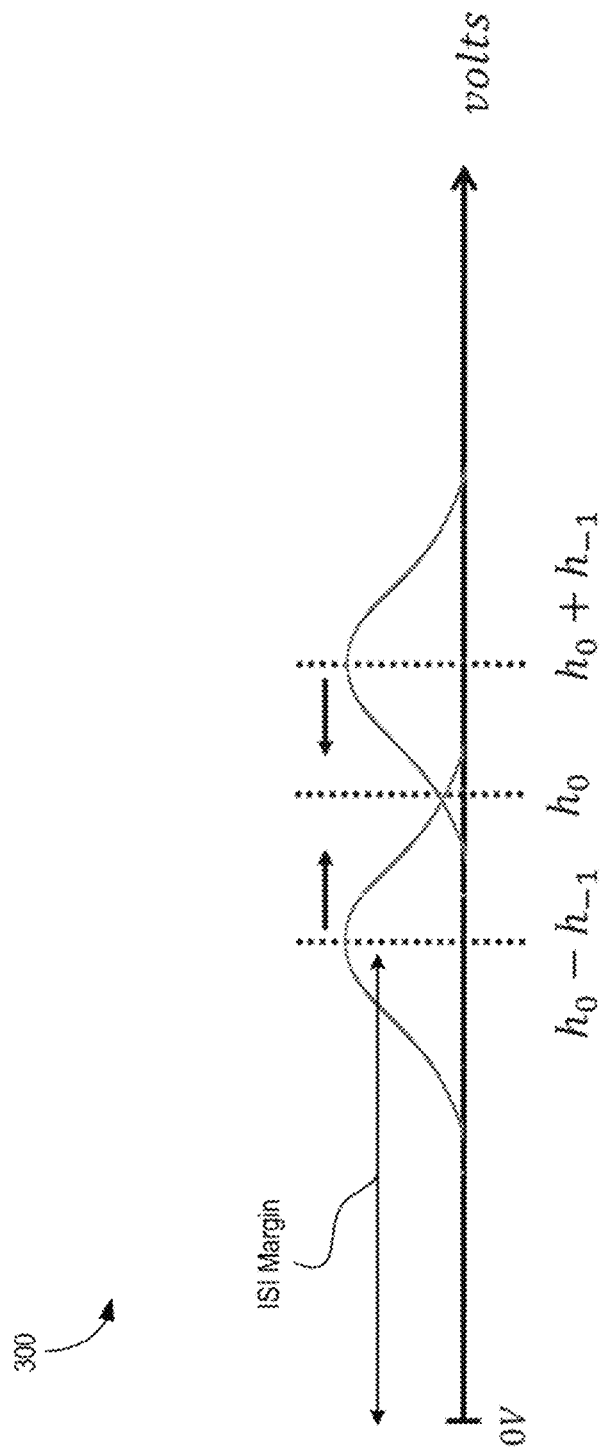
FIG. 3 illustrates a plot showing a model of the closed-loop adaptive scheme of some embodiments.

FIG. 3 illustrates plot 300 showing the model of the closed-loop adaptive scheme of some embodiments. Consider a linear case, where the received data voltage is distorted by ISI and is given explicitly by:

$$y_{RX}(t) = \sum_k a_k h(t - kT) + \xi(t)$$

where $a_k$ are PAM2 (pulse amplitude modulation) symbols, h(t) is the pulse response, and k is transmitter sample index.

Assuming that there are no pre-cursors earlier than k=−1, and that DFE zero forces all casual ISI in receiver, the following receiver slicer voltage $y_{RX}$ is obtained at the sampling instance nT:

$$y_{RX}(nT+\tau)=a_n h_0 + a_{n+1} h_{-1} + \xi_n \quad (1)$$

Here, $h_{n-k}=h((n-k)T+\tau)$ are the channel coefficients at the sampling instances. For example, $h_0$ is the data cursor and $h_{-1}$ is the first residual ISI pre-cursor. With reference to equation 1, $\xi_n$ is a noise term which is uncorrelated with the data, and $\tau$ is the sampling phase offset. Based on equation 1, the probability density function (PDF) of $y_{RX}$ is dependent on the pre-cursor ISI, and that the 0 V voltage margin is given by the noise term and the channel ISI coefficients. Thus, any change in the sampling phase offset $\tau$ may change the 0 V margin at the receiver (RX) slicer.

As shown by equation 1, the first term is the data signal, the second term is a binary noise, while the third term can be assumed as a noise term, which is uncorrelated with the data. Adding all noise terms creates a dual-Dirac noise, which may not be useful for BER prediction. An alternative way, for example, is to view the binary term as a reduction of the signal (which may be correct 50% of the time) instead of a noise. In that case, SNR is then calculated with a Gaussian noise and the BER is predicted. In practice, for PAM2, half of the bits may have much better SNR that may cause negligible BER. This is illustrated by plot 300 of FIG. 3. Plot 300 illustrates a receiver slicer input signal conditional PDF.

So the actual receiver BER $P_b(E)$ is roughly half of the one calculated this way. For example:

$$SNR = \frac{(h_0 - |h_{-1}|)^2}{\sigma^2} \quad (2)$$

$$P_b(E) = \frac{1}{2} Q(\sqrt{SNR})$$

Some embodiments maximize the $\sqrt{SNR}$ by maximizing the signal ISI margin. For example, $\tau^*$ (e.g., ISI margin maximization) is determined such that:

1) $\tau^* = \underset{\tau}{\operatorname{argmax}}(h_0 - |h_{-1}|) \quad (3)$ 2) when both $h_0>0$ and $h_{-1}>0$ then the maximum is located at:

$$\nabla_\tau h_0 = \nabla_\tau h_{-1} \quad (4)$$

where $\nabla_\tau h_0$ is the 0 V margin maximum point.

The above problem is in general, a non-concave maximization problem. In some embodiments, the following minimum mean squared error criterion is used:

$$\tau^* = \underset{\tau}{\operatorname{argmin}} E(a_n - a_n h_0 - a_{n+1} h_{-1})^2 = \underset{\tau}{\operatorname{argmin}} E(e_n^2) \quad (5)$$

where $e_n$ is the error which is expressed as:

$$e_n \equiv a_n - a_n h_0 - a_{n+1} h_{-1}$$

In embodiments, instead of maximizing the actual margin from the 0 V reference, the mean squared error is minimized from the 1 V reference (or some arbitrary reference). Note that, $h_0$ and $h_{-1}$ depend on $\tau$. Thus, the above problem is convex, and the minimization can be solved using gradient descent, in accordance with some embodiments.

Figure 4:
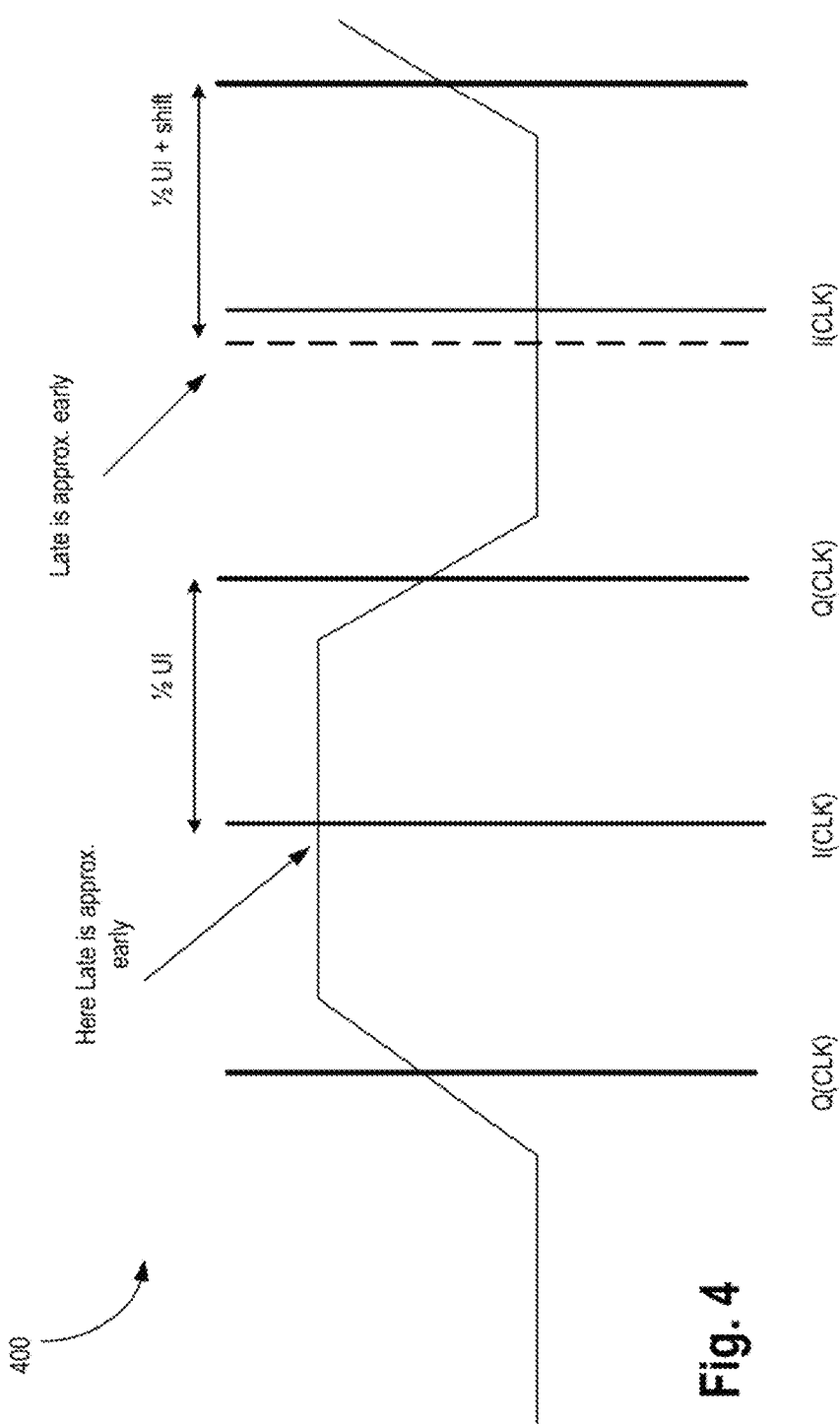
FIG. 4 illustrates a plot showing an adjustment of the natural locking point by a Clock Data Recovery (CDR) circuitry by changing an offset between edge and data clocks using the closed-loop adaptive scheme of some embodiments.

In some embodiments, a data clock phase is shifted relative to an edge clock, from the nominal 0.5 UI (unit interval). This shifts the data sampler locking point, denoted $\tau$. In some embodiments, the closed-loop adaptive scheme changes the "natural" data sampler locking point of the edge based CDR, by changing the timing (or phase) offset between the data and edge clocks used by the data and edge samplers, respectively. The idea is represented in FIG. 4 which illustrates plot 400 showing an adjustment of the natural locking point by a CDR circuitry by changing an offset between edge and data clocks using the closed-loop adaptive scheme of some embodiments.

Various embodiments use Least Mean Squares (LMS) which uses gradient descent to find $\tau$ which minimizes the mean square error cost function. LMS is a class of an adaptive filter used to mimic a desired filter by finding the filter coefficients that relate to producing the least mean square of the error signal (e.g., difference between the desired and the actual signal). It is a stochastic gradient descent method in the filter is adapted based on the error at the current time. For example:

$$\tau_{n+1} = \tau_n - m\nabla_\tau E(e_n^2).$$

The derivative of the mean squared error cost given in Error! Reference source not found. is given by:

$$\nabla_\tau E(e_n^2) = 2E(e_n \nabla_\tau e_n)$$

The derivative of the error $e_n$ with respect to sampling phase $\tau$ is given by:

$$\nabla_\tau e_n = -a_n \nabla_\tau h_0 - a_{n+1} \nabla_\tau h_{-1}$$

Plugging the two equations together yields:

$$\nabla_\tau E(e_n^2) = -2\nabla_\tau h(+\tau) E(e_n a_n) - 2\nabla_\tau h(-T+\tau) E(e_n a_{n+1})$$

Assuming both cursors are located at pulse rising:

$$\nabla_\tau h(\tau) > 0, \nabla_\tau h(-T+\tau) > 0$$

The update equation, which is the composite LMS update equation, is given by:

$$\tau_{n+1} = \tau_n + m_1 E(e_n a_{n+1}) m_0 E(e_n a_n) \quad (6)$$

where $m_1$ and $m_0$ are step sizes for the pre-cursor derivative and the cursor derivative, respectively. The intuition behind the above update equation is to find a CDR locking point that minimizes the pre-cursor ISI, while maintaining a small decrease in signal amplitude, according to some embodiments.

In some embodiments, the zero forcing LMS solution is achieved by setting $m_0=0$. When $m_0=0$, the LMS update equation is given by:

$$\tau_{n+1} = \tau_n + m_1 E(e_n a_{n+1}) \quad (7)$$

Equation 7 is the exact solution for the case where $h_0=1$ for all $\tau$. If the mean value of $e_n a_{n+1}$ is positive, $\tau$ is increased and vice versa. In some embodiments, the adaptation stops when $(a_{n+1} - a_n a_{n+1} h_0 - a_n a_{n+1} h_{-1}) = h_{-1} = 0$.

Some embodiments describe a probabilistic method for analyzing the adaptation scheme. There may be a connection between the LMS scheme and the optimum value given in Error! Reference source not found. According to Error!

Reference source not found., the scheme changes the phase according to the following condition:

$$m_1 E(\hat{e}_n a_{n+1}) + m_0 E(\hat{e}_n a_n) \overset{\text{step down}}{\underset{\text{step up}}{\gtreqless}} 0$$

where $\hat{e}_n$ is the sign of error.

In some embodiments, the scheme stops when:

$$m_1 E(\hat{e}_n a_{n+1}) = m_0 E(\hat{e}_n a_n)$$

Assuming $a_n = 1$, the expectation can be evaluated separately:

$$E(\hat{e}_n a_{n+1}) = \frac{1}{2} E(\hat{e}_n^+) - \frac{1}{2} E(\hat{e}_n^-)$$

$$E(\hat{e}_n a_n = 1) = E(\hat{e}_n)$$

In some embodiments, the value of each expectation is given by the error slicer voltage PDF. In some embodiments, in each phase step, a change in the cursor $h_0$ is expected, denoted $\Delta h_0$, and in the pre-cursor $h_{-1}$ is expected, denoted $\Delta h_{-1}$. Both changes change the PDF of the error from its steady-state value.

For simplicity assume $h_{-1} > 0$, and denote the steady-state probability $p_1$. Namely:

$$p_1 = Pr(a_{n+1} = 1) Pr(\hat{e}_n^+ > 0) = \frac{1}{2} Q\left(-\frac{h_{-1}}{\sigma}\right)$$

$$\frac{1}{4} < p_1 < \frac{1}{2},$$

Denoting the probability change due to $\Delta h_0$ by $\delta_0$, and the change due to $\Delta h_{-1}$ by $\delta_{-1}$, and using to all these, the above error expectations can be expanded as:

$$E(\hat{e}_n^+) = (p_1 - \delta_0 - \delta_{-1}) - \left(\frac{1}{2} - p_1 + \delta_0 + \delta_{-1}\right) = 2p_1 - \frac{1}{2} - 2\delta_0 - 2\delta_{-1}$$

$$E(\hat{e}_n^-) = \left(\frac{1}{2} - p_1 - \delta_0 + \delta_{-1}\right) - (p_1 + \delta_0 - \delta_{-1}) = \frac{1}{2} - 2p_1 - 2\delta_0 + 2\delta_{-1}$$

$$E(\hat{e}_n a_{n+1}) = 4p_1 - 1 - 4\delta_{-1}$$

$$E(\hat{e}_n) = \frac{1}{2} - 2\delta_0 - \frac{1}{2} - 2\delta_0 = -4\delta_0$$

Figure 5:
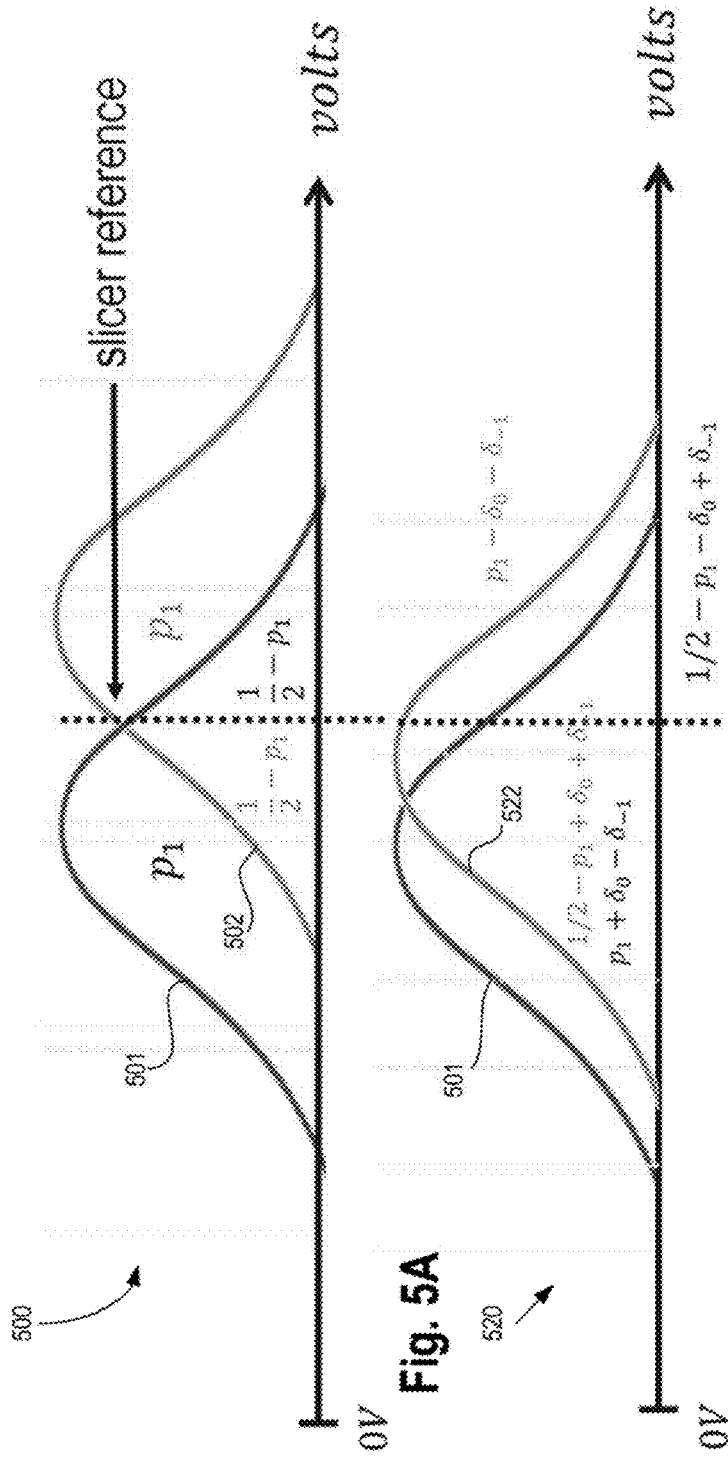
FIGS. 5A-B illustrate plots showing adjustment of sampling phase by the closed-loop adaptive scheme of some embodiments.

The above derivation are illustrated by FIGS. 5A-B. FIGS. 5A-B illustrate plots 500 and 520, respectively, showing an adjustment of sampling phase by the closed-loop adaptive scheme of some embodiments. FIGS. 5A-B illustrate error slicer probabilities change due to a phase step. Plot 500 shows the PDF before a step while plot 520 illustrates the PDF after the step.

In some embodiments, the closed-loop adaptive scheme stops when:

$$m_1(4p_1 - 1 - 4\delta_{-1}) = m_0(-4\delta_0) \quad (8)$$

Fixing $m_1 = 1$, the stop condition of equation 8 is simplified as:

$$4p_1 - 1 - 4\delta_{-1} = 4m_0 \delta_0 \quad (9)$$

So as long as $4m_0 \delta_0$ remains small compared to $4p_1 - 1 - 4\delta_{-1}$, the scheme may allow phase increase, in accordance with some embodiments. In other words, the closed-loop adaptive scheme minimizes $h_{-1}$, while maintaining a small decrease in signal amplitude, according to some embodiments.

In the solution given in Error! Reference source not found., the mild assumption relied is that the sign of the gradient of both cursors are the same, in accordance with some embodiments. In other words, both cursors are located at pulse rising (or pulse falling), in accordance with some embodiments. This assumption may not always hold. In some embodiments, it can be shown that for any practical continuous pulse, if $\nabla_\tau h(\tau) < 0$ and $\nabla_\tau h(-T+\tau) > 0$ then the second expectation may always come out positive. Thus, the closed-loop adaptive scheme may always decrease the phase, and the sampling phase will get closer to the pulse peak, in accordance with some embodiments. Thus, in such a case, the ISI and noise may always decrease, and the SNR may increase, in accordance with some embodiments.

In some embodiments, if an automatic gain control (AGC) is applied during the LMS adaptation, then by definition $\delta_0 = 0$. Therefore, convergence point is at $h_{-1} = 0$, which, in general, may not solve the original problem in Error! Reference source not found. In some embodiments, to strictly solve the problem, AGC is turned off when calculating $E(\hat{e}_n a_n)$. An AGC may be part of an amplifier which receives the input signal from transmission media 102. The gain of the amplifier is adjusted by AGC. Any known AGC scheme may be used to adjust the gain.

In most cases, the causality property of the channel pulse response dictates that when $\tau$ is increased, the amount of post-cursor ISI is increased. Error! Reference source not found. assumes that the DFE zero forces all casual ISI. However, in a DFE receiver, there may be a limit on the amount of ISI that can be canceled. In some embodiments, the maximum value for $\tau$ is limited.

In some embodiments, the closed-loop adaptive scheme may not use any edge-based information. For example, there may be no strict bound on the value of $\tau$. In some cases, for large values of $\tau$, this can cause to a meaningless CDR timing errors and can lead to CDR malfunction. One solution for this problem is to simply limit the maximum value for $\tau$, in accordance with some embodiments. In some embodiments, the pulse shape information is exploited, which dictates that DFE $c_1$ (e.g., first tap) feedback increases with $\tau$, and the adaptation scheme is stopped or halted when $c_1$ feedback becomes sufficiently large. For example, the closed-loop adaptive scheme is stopped near the maximum margin point given in Error! Reference source not found.

Given the above stopping criteria, an alternative rule in terms of the scheme parameters may be deduced as follows:

$$\Delta h_{-1} = \Delta h_0 = \Delta h \rightarrow \delta_{-1} = \delta_0 = \delta$$

Plugging the above rule in the stop condition found in Error! Reference source not found., the following is achieved:

$$4p_1 - 1 - 4\delta = 4m_0 \delta$$

$$m_0 = 1 - \frac{p_1 - \frac{1}{4}}{\delta}$$

The optimum value of $m_0$ is provided by FIG. 6. FIG. 6 illustrates contour map 600 of an optimum value for a step size $m_0$ for cursor correlation by the closed-loop adaptive scheme of some embodiments. In some embodiments, $\delta \ll p_1 m_0 < 0$ criteria is used in practical cases.

Figure 7:
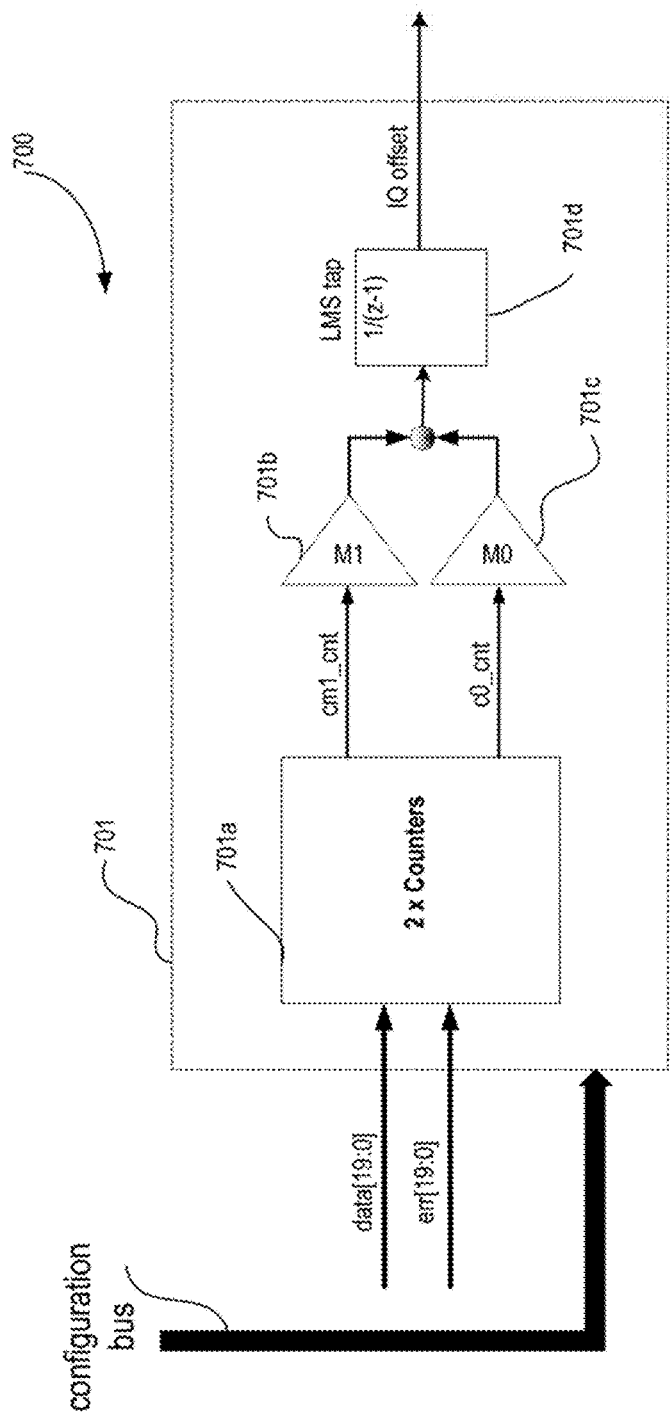
FIG. 7 illustrates a high level architecture of a Least Means Square (LMS) circuitry used by the closed-loop adaptive scheme, according to some embodiments.

FIG. 7 illustrates a high level architecture 700 of the LMS circuitry used by the closed-loop adaptive scheme, according to some embodiments. In some embodiments, LMS circuitry 701 comprises at least two counters 701a, gain stages 701b and 701c, summing node, and LMS tap stage 701d. In some embodiments, the at least two counters 701a generate positive and negative signs when the respective counter reaches a threshold. In some embodiments, the at least two counters 701a receive data (e.g., 20 bit data represented by data[19:0]) and corresponding error (e.g., 20 bit error represented by err[19:0]). In some embodiments, the at least two counters 701a implement the gradient measure given in equation 6. In some embodiments, the outputs of the two counters, cm1_cnt and c0_cnt, respectively, are passed through a gain stage (having gains $m_1$ and $m_0$, respectively) and then summed up to LMS tap 701d (e.g., tap integrator) to generate IQ offset. In some embodiments, IQ offset is the difference in phase of I(CLK) and Q(CLK) as illustrated with reference to FIG. 3.

Referring back to FIG. 7, in some embodiments, LMS circuitry 701 applies composite LMS with variable step sizes to find a CDR locking point that maximizes the ISI margin. In some embodiments, this is done by allowing the minimization of the ISI, while maintaining a small decrease in signal amplitude. In some embodiments, the at least two counters 701a measure the correlation/statistics and implement the gradients measure. In some embodiments, LMS circuitry 701 (which is also referred to as the phase adjusting circuitry) is controlled by finite state machine (FSM) configurations provided via configuration bus. In some embodiments, FSM configurations are fully controlled by registers accessed using a Micro Controller (not shown). For example, some registers can also be used in the startup flow for link convergence, or by an external user to study its behavior in different scenarios (e.g., ISI, jitter, analog impairments, etc.). The LMS circuitry 701 measures the statistics of the input signal using data and error slicers and updates the offset tap according to Error! Reference source not found., in accordance with some embodiments.

In some embodiments, LMS circuitry 701 performs the following:

Inputs: D, E (data and error slicers' outputs), C (DFE tap)
Parameter: M0 (same as $m_0$) M1 (same as $m_1$)—scale, T—threshold (slowness), LDFE—limit for DFE
Output: X—step
Internal state: R
Initialize: R=0
1. Collect 24 values of D and 24 values of E
2. R<=R+M1*sum(E[n] D[n+1])+M0*sum(E[n] D[n])
3. if R≥T and C<LDFE then X=1, R<=R−T
4. if R≤−T then X=−1, R<=R+T
5. else X=0
6. go to 1

Figure 8A:
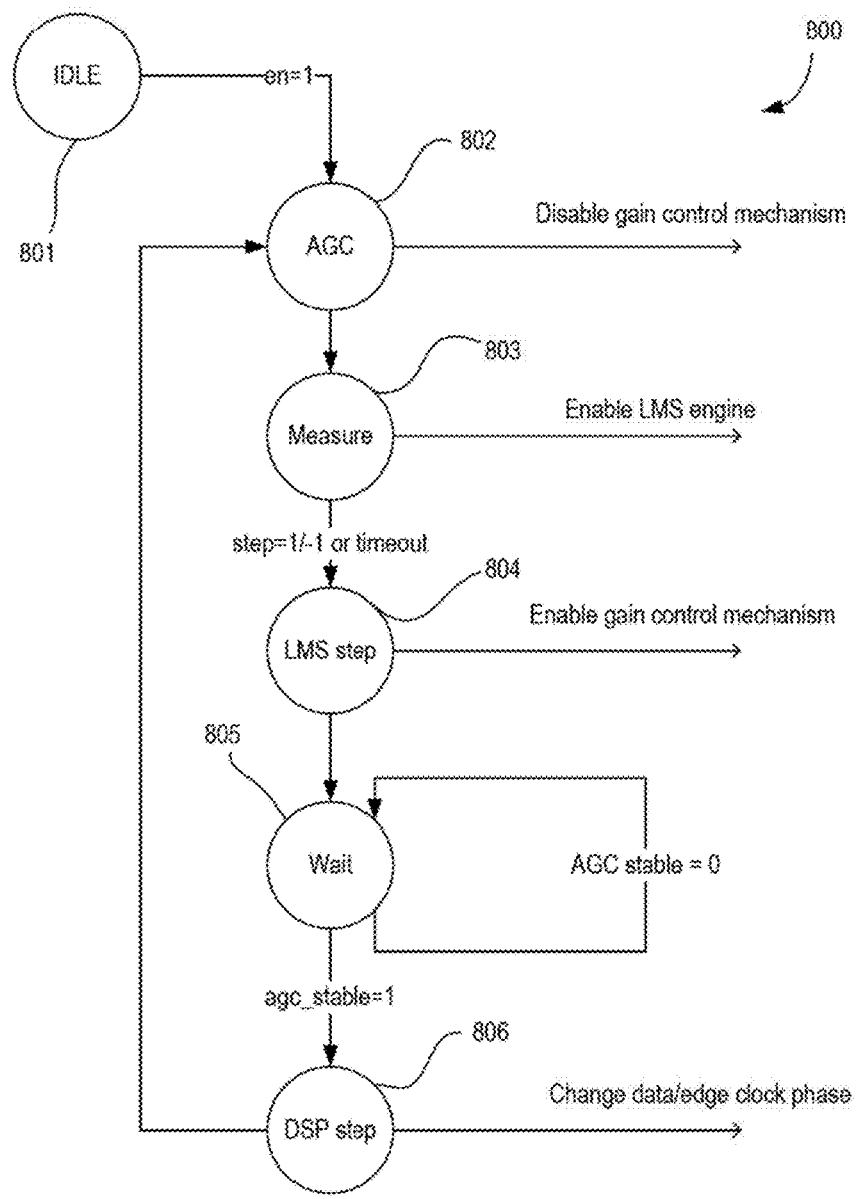
FIG. 8A illustrates a finite state machine (FSM) that controls the operating configurations for the closed-loop adaptive scheme, according to some embodiments.

FIG. 8A illustrates a state diagram 800 for the FSM that controls the operating configurations (e.g., input to the LMS phase adjusting circuitry) for closed-loop adaptive scheme, according to some embodiments. In some embodiments, state diagram 800 comprises six states including: IDLE 801, AGC 802, Measure 803, LMS step 804, WAIT 805, and DSP step 806. In some embodiments, when the closed-loop adaptive scheme is enabled, en=1. As such, FSM proceeds from IDLE state 801 to AGC state 802.

In some embodiments, at AGC state 802 a determination is made whether the receiver architecture includes an AGC. If it does, then the logic or circuitry controlled in the automatic gain control is frozen or paused. For example, a Disable signal is generated to disable the gain control mechanism. The state diagram then proceeds to Measure state 803. In some embodiments, if AGC does not exist in a receiver, then FSM proceeds from IDLE state 801 directly to the Measure state 803 when the closed-loop adaptive scheme is enabled.

At Measure state 803, the step candidate is measured using LMS circuitry of FIG. 7. For example, Measure state 803 generates an enable signal which is provided to LMS circuitry 701 via configuration bus to enable the LMS circuitry 701. In some embodiments, LMS circuitry 701 performs the following:

$$\tau_{n+1}^c = \tau_n - m_1 E(e_n a_{n+1}) - m_0 E(e_n a_n)$$

In some embodiments, after Measure state 803 enables the LMS process and the step candidate is either +1, −1, or none of them (e.g., a timeout condition), the state diagram proceeds to LMS step state 804. For example, when Measure state 803 enables the LMS process and the at least two counters 701a generate either cm1_cnt=1 (indicating a step candidate of +1) or c0_cnt (indicating a step candidate of −1), then the state diagram proceeds to LMS step state 804.

In some embodiments, at LMS step state 804, AGC is enabled. For example, the gain control mechanism is enabled. The state machine then proceeds to Wait state 805 where the closed-loop adaptive scheme remains idle and waits for the AGC scheme to stabilize. When AGC is stable (e.g., when AGC_stable=1), then the state machine proceeds to DSP step state 806. At this state the IQ offset generated by LMS circuitry 701 is used to change the data/edge clock phase. For example, $\tau_{n+1} = \tau_{n+1}^c$ is output and the state proceeds to AGC state 802 and the process continues. As such, pre-cursor ISI is cancelled or minimized.

The FSM of FIG. 800 can be implemented in hardware description language as follows:

```
case (state)
    IDLE: begin
        if (csr_dsp_phad_fsm_en_r )
            state_nxt = MEASURE_PH;
    end
    MEASURE_PH: begin //stop dsp_lms
        clr_wd_timer         = 1'b0;
        wd_limit             = csr_dsp_phad_fsm_wd_timer_limit_us;
        dsp_phad_stop_lms    = csr_dsp_phad_fsm_stop_lms_val;
        if (lms_upd_strb || wd_timer_done) begin
            dsp_phad_clr_dsp_stable = csr_dsp_phad_fsm_clr_dsp_stable_val;
            if ((~lms_upd_strb) & csr_dsp_phad_fsm_stop_on_no_upd)
                state_nxt = DONE;
            else
                state_nxt = WAIT_FOR_DSP_STABLE_FALL;
        end
```

```
        end
    WAIT_FOR_DSP_STABLE_FALL: begin
        if (!dsp_agc_stable)
            state_nxt = DSP_ADAPT;
        end
    DSP_ADAPT: begin
        clr_wd_timer           = 1'b0;
        phase_lms_upd_en       = 1'b0;
        wd_limit               = csr_dsp_phad_fsm_wd_timer_limit2_us;
        if (dsp_agc_stable || wd_timer_done)
            state_nxt = DSP_STEP;
        end
    DSP_STEP: begin
        //lms step -> ANA
        // in case there was no lms_strb a step back would be initiated
        if ( (dsp_dfe_coef1_r <= csr_dsp_phad_dfe_c1_lim) &&
(dsp_dfe_coef1_f <= csr_dsp_phad_dfe_c1_lim) )
            upd_ana_reg = 1'b1;
            clr_phase_measurement = 1'b1;
            state_nxt = WAIT_BEFORE_MEAS;
        end
    WAIT_BEFORE_MEAS: begin
        clr_phase_measurement = 1'b1;
        clr_wd_timer             = 1'b0;
        wd_limit                 = csr_dsp_phad_fsm_min_time_after_step_us;
        dsp_phad_stop_lms        = csr_dsp_phad_fsm_stop_lms_val;
        if (wd_timer_done || !wd_limit_neq0) //if limit ==0 skip
            state_nxt     = MEASURE_PH;
        end
    DONE: begin
        end
    Endcase
```

In some embodiments, in startup mode the closed-loop adaptive scheme adapts the phase offset during phase convergence according to the LMS scheme. In some embodiments, during the startup mode, CDR should be active, the error slicer should be fixed on VREF/−VREF and the closed-loop adaptive scheme should be enabled when AGC_stable equals 1.

Figure 8B:
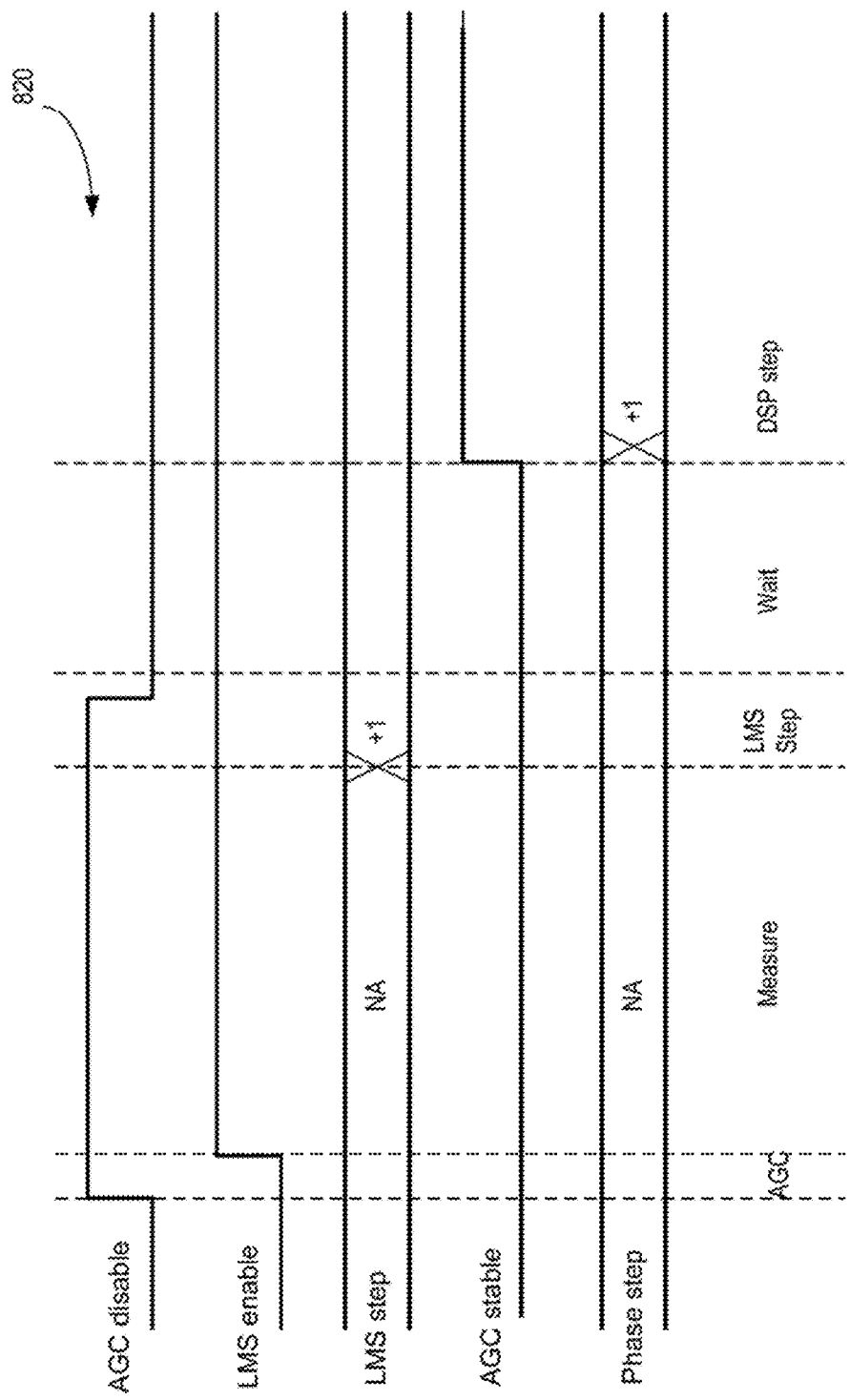
FIGS. 8B-C illustrate a set of waveforms showing operation of the FSM of FIG. 8A, according to some embodiments.
Figure 8C:
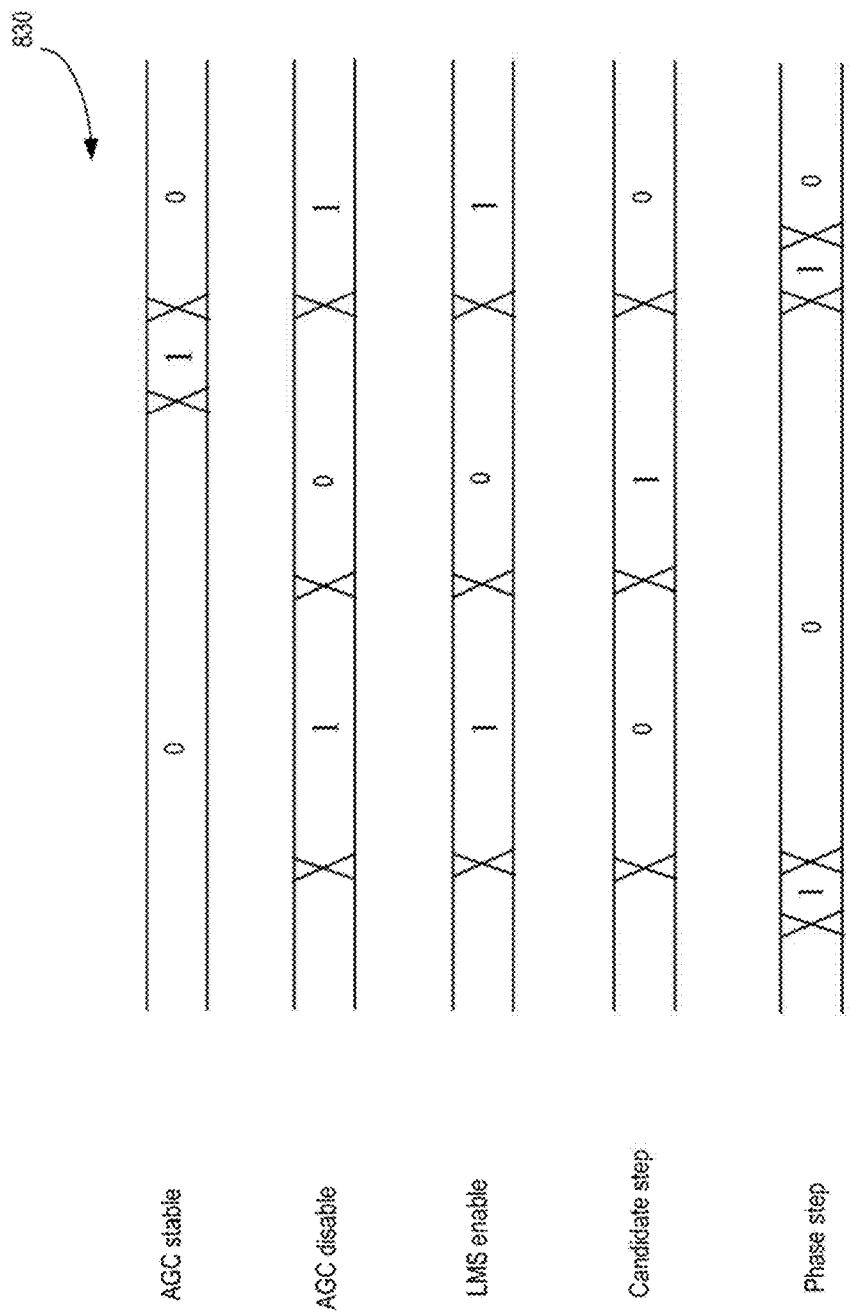

FIGS. 8B-C illustrate a set of waveforms 820 and 830, respectively, showing operation of the FSM of FIG. 8A, according to some embodiments. The set of waveforms 820 includes AGC disable, LMS enable, LMS step, ADC stable, and Phase step. When AGC disable is high, AGC is disabled. In some embodiments, after the AGC is disabled can the LMS be enabled. This is why LMS enable signal is asserted after AGC disable is asserted, for example. In some embodiments, after LMS circuitry 701 is enabled, the step candidate is measured as discussed with reference to FIG. 8A. Once the step size is measured, then the at least two counters 701a generate either cm1_cnt=1 (indicating a step candidate of +1) or c0_cnt (indicating a step candidate of −1). After that, the state diagram proceeds to LMS step state 804. After LMS step is determined, the AGC is enabled and the FSM waits for the AGC to stabilize. For example, when a font-end gain update toggles between ± for several consecutive updates, AGC is considered to have stabilized. In some embodiments, FSM waits for predetermined time for the AGC to stabilize. In some embodiments, FSM waits for a programmable time for the AGC to stabilize (e.g., few micro-seconds).

When the AGC becomes stabilizes, "AGC stable" signal is asserted, for example. Once the AGC is stable, the phase offset between the data (in-phase) and edge clock (quadrature-phase) is adjusted as indicated by "Phase step", such that the CDR will have a new locking point, denoted τ. In other words, the scheme changes the "natural" locking point of the Alexander based CDR, by changing the offset between the edge and data clocks. The set of waveforms 830 of FIG. 8C shows another version of the FSM and LMS system operation.

Figure 9:
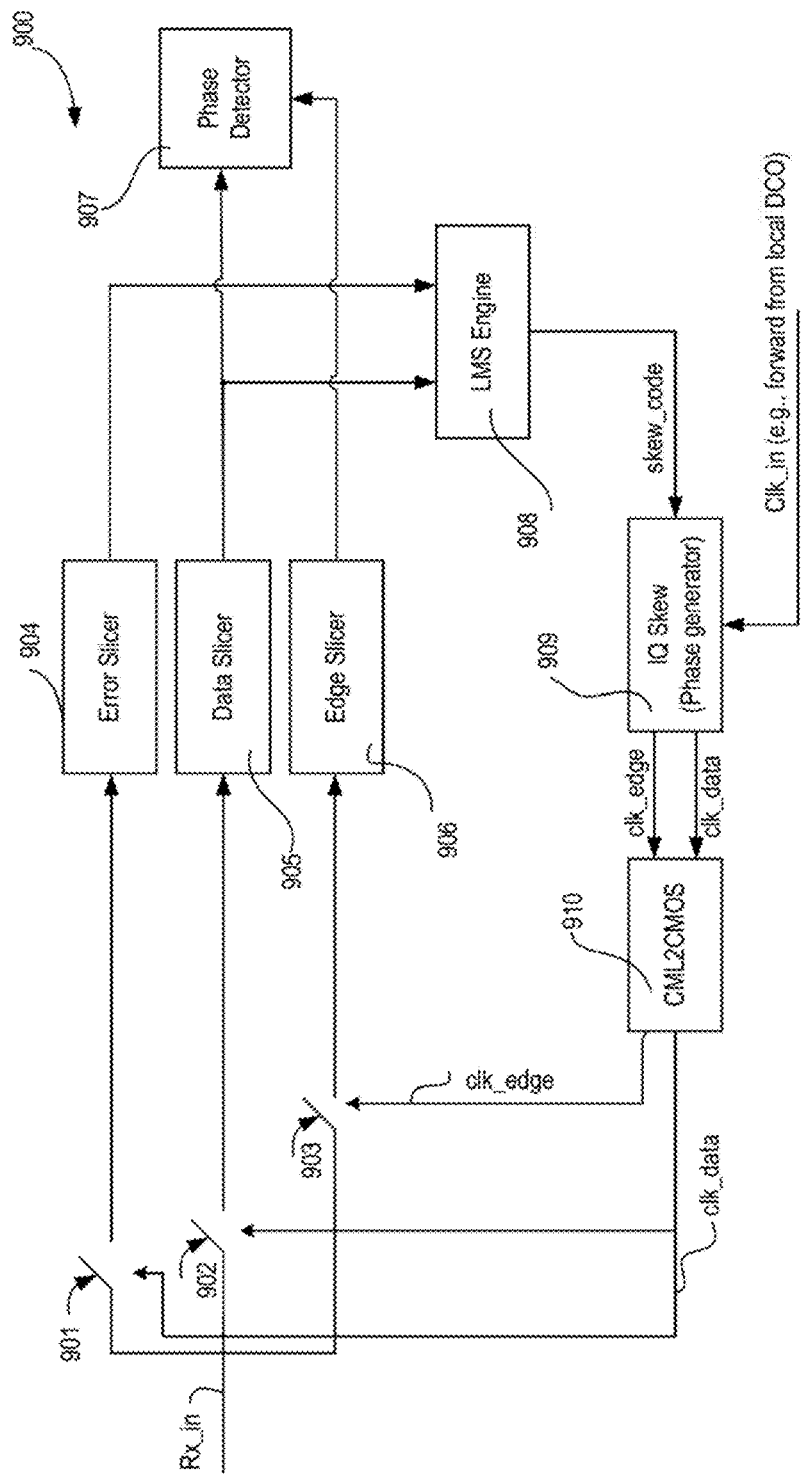
FIG. 9 illustrates an architecture of the closed-loop adaptive scheme to reduce or cancel pre-cursor ISI, according to some embodiments.

FIG. 9 illustrates architecture 900 of the closed-loop adaptive scheme to reduce or cancel pre-cursor ISI, according to some embodiments. In some embodiments, the closed-loop adaptive scheme comprises sampling circuits 901, 902, and 903, error slicer (or sampler) 904, data slicer (or sampler) 905, and edge slicer (or sampler) 906, phase detector 907, LMS engine 908 (e.g., LMS circuitry 701 of FIG. 7), Phase generator 909, and Current Mode Logic to CMOS converter (CML2CMOS) 910 coupled together as shown. Any suitable CML2CMOS converter can be used here. Architecture 900 is part of a clock data recovery (CDR) circuitry, and here is also referred to as CDR circuit 900.

In some embodiments, CDR circuit 900 may receive incoming data streams (Rx_in). The incoming data streams may be received from various sources (e.g., local or remote) over any one of a number of medium, e.g., over a direct coupling, a bus, or a communication channel. In some embodiments, sampling circuits 901, 902, and 903 may sample the incoming data stream to generate corresponding sampled data streams, received in error slicer 904, data receiver or data slicer 905, and edge receiver or edge slicer 904, respectively. In some embodiments, sampling circuits 901 and 902 use data clock (clk_data) as the sampling clock for sampling Rx_in while sampling circuit 903 uses the edge clock (clk_edge) for sampling Rx_in.

In some embodiments, clk_edge and clk_data are generated by phase generator 909 which may receive an input clock Clk_in and a slew_code from LMS engine 908. In some embodiments, Clk_in is generated from a local oscillator. For example a digitally controlled oscillator (DCO) or a voltage controlled oscillator (VCO) may be used to generate the Clk_in for Phase generator 909. In other embodiments, Clk_in is generated from any other clock source (e.g., phase locked loop). In some embodiments, the phase between the clk_edge and the clk_data is adjusted according to the slew code generated by LMS Engine 908.

In some embodiments, LMS Engine 908 receives sampled data from data slicer 905 and error from error slicer 904 as discussed with reference to FIG. 7. In some embodiments, LMS engine 908 implements a fixed-point machine that computes an estimate for the update equation given in Equation 6. For example, LMS engine 908 first computes an update for the two expectations terms, given by Equation 6. The step for the first expectation and the step for the second expectation estimates are scaled and summed according to (e.g., a programmable) $m_1$ and $m_0$, respectively. Then the total sum drive a new input value for the delay using a discrete time accumulator.

Figure 10:
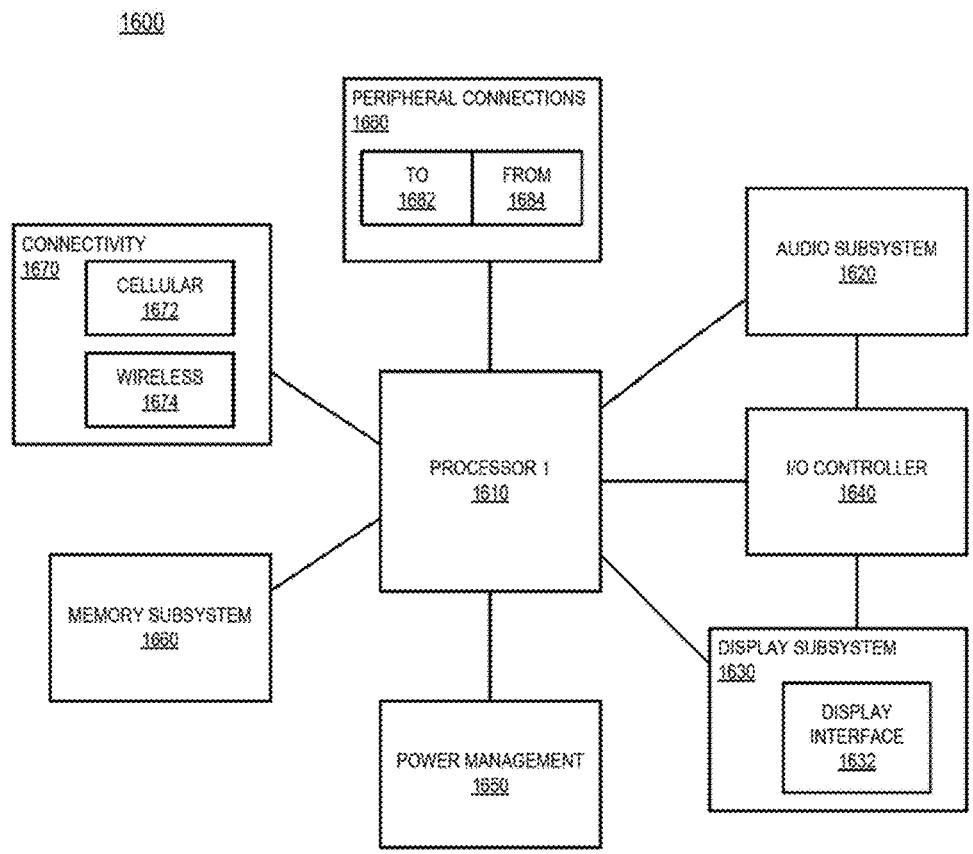
FIG. 10 illustrates a smart device or a computer system or a SoC (System-on-Chip) with the closed-loop adaptive scheme, according to some embodiments.

FIG. 10 illustrates a smart device or a computer system or a SoC (System-on-Chip) with the closed-loop adaptive scheme, according to some embodiments. It is pointed out that those elements of FIG. 10 having the same reference numbers (or names) as the elements of any other figure can operate or function in any manner similar to that described, but are not limited to such.

FIG. 10 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes first processor 1610 having a receiver with the closed-loop adaptive scheme, according to some embodiments discussed. Other blocks of the computing device 1600 may also include the closed-loop adaptive scheme, according to some embodiments. In some embodiments, the entire SoC is provided with the adaptive voltage system. The various embodiments of the present disclosure may also comprise a network interface within 1670 such as a wireless interface so that a system embodiment may be incorporated into a wireless device, for example, cell phone or personal digital assistant.

In some embodiments, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. Various embodiments here can be can be combined with any of the other embodiments thereby allowing various combinations.

Example 1 is an apparatus which comprises: a data slicer to receive first data sampled by a data clock; an edge slicer to receive second data sampled by an edge clock; and a Least Mean Square (LMS) circuitry coupled to the data and edge slicers, wherein the LSM circuitry is to generate a code to adjust a phase of one of the data clock and/or edge clocks relative to one another.

Example 2 includes all features of example 1, wherein the apparatus of example 1 comprises a phase generator coupled to the LMS circuitry, wherein the phase generator is to receive the code and to adjust the phase of one of the data clock and/or edge clocks relative to one another, and wherein the phase generator is to generate a first data clock and a first edge clock.

Example 3 includes all features of example 2, wherein the apparatus of example 3 comprises a current mode logic to CMOS (CML2CMOS) converter coupled to the phase generator, wherein the CML2CMOS converter is to convert the first data clock and the first edge clock into the data clock and the edge clock, respectively.

Example 4 includes all features of example 1, wherein the apparatus of example 4 comprises a first sampler to sample an input data using the data clock, wherein the first sampler is to generate the first data.

Example 5 includes all features of example 2, wherein the apparatus of example 5 comprises a second sampler to sample the input data using the edge clock, wherein the second sampler is to generate the second data.

Example 6 includes all features of example 2, wherein the apparatus of example 6 comprises a finite state machine (FSM) to pause adjustment to an automatic gain control (AGC) circuitry before the phase of one of the data clock and/or the edge clock is adjusted relative to one another.

Example 7 includes all features of example 6, wherein the FSM is to enable the LMS circuitry to generate the code after adjustment to the AGC circuitry is paused.

Example 8 includes all features of example 7, wherein the FSM is to un-pause adjustment to the AGC circuitry after the LMS circuitry generated the code.

Example 9 includes all features of example 8, wherein the FSM is to wait for a predetermined time which is enough for the AGC circuitry to become stable after adjustment to the AGC is un-paused.

Example 10 includes all features of example 9, wherein the FSM is to allow the code to adjust the phase of one of the data clock and/or the edge clock relative to one another after the AGC circuitry is to become stable.

Example 11 includes all features of example 8, wherein the apparatus of example 11 comprises a decision feedback equalizer coupled to the AGC circuitry.

Example 12 is a method which comprises: receiving input data; disabling a gain control mechanism which adjusts gain of an amplifier that amplifies the received input data; enabling a least mean square (LMS) circuitry; determine a step candidate associated with the LMS circuitry to generate a phase offset code; enabling the gate control mechanism; and applying the phase offset code to adjust a phase of one of data clock and/or edge clock relative to one another.

Example 13 includes all features of claim 12, wherein the method of example 13 comprise waiting for the amplifier to stabilize after the gain control mechanism is enabled.

Example 14 includes all features of example 13, wherein the method of example 13, wherein the method of example 14 comprises sampling the amplified received input data using the data clock.

Example 15 includes all features of example 13, wherein the method of example 15 comprises sampling the amplified received input data using the edge clock.

Example 16 is a system which comprises: a memory; a processor coupled to the memory, the processor comprising a receiver which includes: a data slicer to receive first data sampled by a data clock; an edge slicer to receive second data sampled by an edge clock; and a Least Mean Square (LMS) circuitry coupled to the data and edge slicers, wherein the LSM circuitry is to generate a code to adjust a phase of one of the data clock and/or edge clocks relative to one another; and a wireless interface to allow the processor to communicate with another device.

Example 17 includes all features of example 16, wherein the receiver is coupled to a transmitter via a channel.

Example 18 includes all features of example 17, wherein the transmitter includes a finite impulse response filter.

Example 19 includes all features of example 16, wherein the receiver includes a decision feedback equalizer.

Example 20 includes all features of example 16, wherein the receiver includes a phase generator coupled to the LMS circuitry, wherein the phase generator is to receive the code and to adjust the phase of one of data clock and/or edge clock relative to one another, and wherein the phase generator is to generate a first data clock and a first edge clock.

Example 21 includes all features of example 20, wherein the receiver comprises a current mode logic to CMOS (CML2CMOS) converter coupled to the phase generator, wherein the CML2CMOS converter is to convert the first data clock and the first edge clock into the data clock and the edge clock, respectively.

Example 22 includes all features of example 16, wherein the receiver comprises a first sampler to sample an input data using the data clock, wherein the first sampler is to generate the first data.

Example 23 includes all features of example 16, wherein the receiver comprises a second sampler to sample the input data using the edge clock, wherein the second sampler is to generate the second data.

Example 24 includes all features of example 16, wherein the receiver comprises a finite state machine (FSM) to pause adjustment to an automatic gain control (AGC) circuitry before the phase of one of the data clock and/or the edge clock is adjusted relative to one another.

Example 25 includes all features of example 24, wherein the FSM is to enable the LMS circuitry to generate the code after adjustment to the AGC circuitry is paused.

Example 26 includes all features of example 25, wherein the FSM is to un-pause adjustment to the AGC circuitry after the LMS circuitry generated the code.

Example 27 includes all features of example 26, wherein the FSM is to wait for a predetermined time which is enough for the AGC circuitry to become stable after adjustment to the AGC is un-paused.

Example 28 includes all features of example 27, wherein the FSM is to allow the code to adjust the phase of one of the data clock and/or the edge clock relative to one another after the AGC circuitry is to become stable.

Example 29 according to any one of examples 24 to 28, wherein the receiver comprises a decision feedback equalizer coupled to the AGC circuitry.

Example 30 is an apparatus which comprises: means for receiving input data; means for disabling a gain control mechanism which adjusts gain of an amplifier that amplifies the received input data; means for enabling a least mean square (LMS) circuitry; means for determining a step candidate associated with the LMS circuitry to generate a phase offset code; means for enabling the gate control mechanism; and means for applying the phase offset code to adjust a phase of one of data clock and/or edge clock relative to one another.

Example 31 includes all features of example 30, wherein the apparatus of example 30 comprises means for waiting for the amplifier to stabilize after the gain control mechanism is enabled.

Example 32 includes all features of example 30, wherein the apparatus of example 30 comprises means for sampling the amplified received input data using the data clock.

Example 33 is according to any one of examples 30 to 32 comprises means for sampling the amplified received input data using the edge clock.

Example 34 is a system which comprises: a memory; a processor coupled to the memory, the processor comprising a receiver which includes an apparatus according to any one of examples 30 to 33; and a wireless interface to allow the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a data slicer to receive first data sampled by a data clock;
an edge slicer to receive second data sampled by an edge clock;
a Least Mean Square (LMS) circuitry coupled to the data and edge slicers, wherein the LMS circuitry is to generate a code to adjust a phase of one of the data clock or edge clock relative to one another;
a phase generator coupled to the LMS circuitry, wherein the phase generator is to receive the code and to adjust the phase of one of the data clock or edge clock relative to one another, and wherein the phase generator is to generate a first data clock and a first edge clock; and
a current mode logic to CMOS (CML2CMOS) converter coupled to the phase generator.

2. The apparatus of claim 1, wherein the CML2CMOS converter is to convert the first data clock and the first edge clock into the data clock and the edge clock, respectively.

3. The apparatus of claim 1 comprises a sampler to sample an input data using the data clock, wherein the first sampler is to generate the first data.

4. The apparatus of claim 3, wherein the sampler is a first sampler, wherein the apparatus comprises a second sampler to sample the input data using the edge clock, and wherein the second sampler is to generate the second data.

5. The apparatus of claim 1 comprises a finite state machine (FSM) to pause adjustment to an automatic gain control (AGC) circuitry before the phase of one of the data clock and/or the edge clock is adjusted relative to one another.

6. The apparatus of claim 5, wherein the FSM is to enable the LMS circuitry to generate the code after adjustment to the AGC circuitry is paused.

7. The apparatus of claim 6, wherein the FSM is to un-pause adjustment to the AGC circuitry after the LMS circuitry generated the code.

8. The apparatus of claim 7, wherein the FSM is to wait for a predetermined time which is enough for the AGC circuitry to become stable after adjustment to the AGC is un-paused.

9. The apparatus of claim 8, wherein the FSM is to allow the code to adjust the phase of one of the data clock and/or the edge clock relative to one another after the AGC circuitry is to become stable.

10. The apparatus of claim 5 comprises a decision feedback equalizer coupled to the AGC circuitry.

11. A method comprising:
receiving input data;
disabling a gain control mechanism which adjusts gain of an amplifier that amplifies the received input data;
enabling a least mean square (LMS) circuitry;
determining a step candidate associated with the LMS circuitry to generate a phase offset code;
enabling the gain control mechanism; and
applying the phase offset code to adjust a phase of one of a data clock and/or an edge clock relative to one another.

12. The method of claim 11 comprises waiting for the amplifier to stabilize after the gain control mechanism is enabled.

13. The method of claim 12 comprises sampling the amplified received input data using the data clock.

14. The method of claim 12 comprises sampling the amplified received input data using the edge clock.

15. A system comprising:
a memory;
a processor coupled to the memory, the processor comprising a receiver which includes:
a data slicer to receive first data sampled by a data clock;
an edge slicer to receive second data sampled by an edge clock;
a Least Mean Square (LMS) circuitry coupled to the data and edge slicers, wherein the LMS circuitry is to generate a code to adjust a phase of one of the data clock or edge clock relative to one another;
a phase generator coupled to the LMS circuitry, wherein the phase generator is to receive the code and to adjust the phase of one of the data clock or edge clock relative to one another, and wherein the phase generator is to generate a first data clock and a first edge clock; and
a finite state machine (FSM) to pause adjustment to an automatic gain control (AGC) circuitry before the phase of one of the data clock or the edge clock is adjusted relative to one another; and
a wireless interface to allow the processor to communicate with another device.

16. The system of claim 15, wherein the receiver is coupled to a transmitter via a channel.

17. The system of claim 16, wherein the transmitter includes a finite impulse response filter.

18. The system of claim 15, wherein the receiver includes a decision feedback equalizer.

19. The system of claim 15, wherein the processor comprises a current mode logic to CMOS (CML2CMOS) converter coupled to the phase generator.

20. The system of claim 19, wherein the CML2CMOS converter is to convert the first data clock and the first edge clock into the data clock and the edge clock, respectively.

* * * * *